United States Patent
Weiss (10) Patent No.: US 7,277,784 B2
(45) Date of Patent: Oct. 2, 2007

(54) COMBINATION OF A SELF-MOVING HARVESTING MACHINE AND A TRANSPORT VEHICLE

(75) Inventor: Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 146 days.

(21) Appl. No.: 10/517,361

(22) PCT Filed: May 16, 2003

(86) PCT No.: PCT/EP03/05144

§ 371 (c)(1),
(2), (4) Date: Jul. 25, 2005

(87) PCT Pub. No.: WO03/101178

PCT Pub. Date: Dec. 11, 2003

(65) Prior Publication Data

US 2006/0150584 A1 Jul. 13, 2006

(30) Foreign Application Priority Data

May 31, 2002 (DE) .................. 102 24 939

(51) Int. Cl.
*G06F 7/70* (2006.01)
(52) U.S. Cl. .................... 701/50; 701/49; 172/4.5; 172/2
(58) Field of Classification Search .......... 701/49, 701/50; 56/10.2 E, 10.2 G; 172/4.5, 5, 172/9, 2
See application file for complete search history.

(56) References Cited

U.S. PATENT DOCUMENTS 6,401,549 B1 * 6/2002 Ohlemeyer ............... 73/861.73
6,803,854 B1 * 10/2004 Adams et al. ............. 340/531

FOREIGN PATENT DOCUMENTS

| DE | 1681008 | 7/1954 |
|---|---|---|
| DE | 19608014 | 3/1996 |

* cited by examiner

*Primary Examiner*—Gertrude A. Jeanglaude (57) ABSTRACT

The invention refers to a combination of a self-propelled harvester (32) and a transport vehicle (33), set up to accept crops from the harvester, which has at least one driven and at least one steered axle, wherein the transport vehicle (33) has an electronic control unit (38) which is set up to control the driven and the steered axle of the transport vehicle (33), and the control unit (38) is connected to a receiving unit which is set up to receive position data for the harvester (32) so that the control unit (38) can be operated to control the transport vehicle (33) to accept crops from the harvester (32) automatically with respect to a position of the harvester (32).

The proposal is made that the control unit (38) be operable to automatically make the transport vehicle (32) drive parallel to the harvester (32) and to be docked to it so as to be able to accept crops from the harvester (32), and that the transport vehicle (33) be unmanned.

17 Claims, 9 Drawing Sheets

COMBINATION OF A SELF-MOVING HARVESTING MACHINE AND A TRANSPORT VEHICLE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

1. Field of the Invention

The invention concerns a combination of a self-propelled harvester and a transport vehicle set up to receive crops from the harvester, which has at least one driven and at least one steered axle, wherein the transport vehicle has an electronic control unit which is set up to control the driven and steered axle of the transport vehicle, and the control unit is connected with a receiving unit that is set up to receive position data for the harvester, so that the control unit can be operated to control the transport vehicle to receive crops from the harvester automatically, relative to a position of the harvester.

2. Description of Related Art Including Information Disclosed Under 37 CFR 1.97 and 1.98

In the mid-1950s, one-axle vehicles in agriculture were replaced by driving-axle trailers, since tractors with low but sufficient power did not have sufficient mass to pull the trailers, which were twice as heavy under adverse weather conditions. The driving-axle trailer was coupled to the tractor with a mechanical towing bar and driven by means of the tractor's power take-off shaft. The traction weight of the transport unit could, in this way, be increased by the mass of the driving-axle trailer plus the load, and thus be distributed on the wheels so that each wheel also drove and braked the load which it carried. Since suitable control electronics were still lacking so as to adapt the rotational speed of the tractor wheels and driving-axle trailer wheels to different curve radii, it happened under certain conditions that the driving-axle trailer would topple the tractor, which led to deadly accidents. The production and sale of driving-axle trailers was therefore discontinued. Present-day electronics permit the functionality described above to be constituted safely.

In the VDI [Association of German Engineers] Report 1356 "Farm Technology 1997," Tapazdi summarized results of his dissertation "Possibilities in improving the wheel-ground contact" as follows:

| Lfd. ② | Fahrzeugantrieb ③ | % Boden normal ④ | Schlupf ① Boden nass ⑤ | % schwer/nass ⑥ |
|---|---|---|---|---|
| 1 | Hinterradantrieb ⑦ | 22 | 40 | 60 |
| 2 | 1 + Vorderrad ⑧ | 20 | 28 | 55 |
| 3 | 2 + Triebachser ⑨ | 18 | 20 | 40 |
| 4 | 3 + Reifendruck ① ⑩ | 14 | 16 | 35 |

Key:
① Slippage
② Consecutive
③ Vehicle drive
④ Ground normal
⑤ Ground wet
⑥ Heavy/wet
⑦ Rear wheel drive
⑧ 1 + Front wheel
⑨ 2 + Driving axle
① ⑩ 3 + Tire pressure The slippage values refer to the rear wheel of the tractor, wherein a slippage of 20% represents a good value in agriculture for normal ground. From the table one can see that this value is established after switching on the front wheel driving axle. Switching on the driving-axle trailer does not bring any substantial advantages under the described conditions.

On wet ground, however, a slippage of 20% can be maintained only after switching on the drive of the driving-axle trailer. On wet, heavy ground, however, this measure is not sufficient to ensure a satisfactory mobility and traction. However, activation of the tire pressure regulation unit on all wheels can prevent the transport vehicles from getting stuck.

If one considers the size and the weight of the transport trailers displayed at the Agritechnica Fair, Hannover 2001, and the self-propelled harvesters and the increased throughputs of the machines due to the greater work widths and higher speeds, then the demand must be made to lower the stress on the ground by using lightweight materials and improved machine designs. With regard to machine designs, the following rough calculations can be made. If one assumes a throughput of a field chaff-cutter of 150 t/h, then 8.3 transport vehicles of the unit "tractor plus 20 t tandem-trailer (not driven)" are needed, without addressing transport distance factors.

If one uses a tandem-driving-axle trailer, which can also pull a 30-ton three-axle trailer, then the transport needs can be managed by 3.3 transport units. That means a savings of 5 tractors, which must offset the costs for the single-wheel drives of the driving-axle trailers.

If, with a knowledge of experiments with "driver assistance systems," one attacks the problem in a very logical manner and switches to tridem-driving-axle trailers, then there can be an economizing of 8.3 tractors, wherein the chaff material of 2.8 rigs can be handled with two tridem-driving-axle trailers.

In June 1999, Daimler-Chrysler presented, on the Autobahn A 81, prototypes of two commercial vehicles with an "electronic towing bar." The two vehicles were electronically coupled with one another so that the leading vehicle was steered, accelerated, and decelerated by a driver, as usual, while the following vehicle, without a driver, followed the lead vehicle with a "virtual towing bar," as it were, at a short distance and a matched speed.

Driver assistance systems of this type differ from the servo systems in that they are equipped with additional electronics and have intelligence, relieving the driver of driving decisions and steering work in critical situations.

That can be explained with the example of ABS brakes. ABS intervenes if the driver overbrakes the vehicle so that the wheels tend to lock. With ABS, however, locking of the wheels can be avoided without driver involvement, so that the control of the vehicle on the road is not lost and it can be safely braked. Future vehicles are no longer conceivable without driver assistance of this type and without mechatronics.

DE 197 05 842 A describes a harvesting method in which harvesters are remote-controlled from a control site. However, the harvester can also be conducted on its path by a navigation system, for example, GPS, or by systems for the row recognition of harvest crops, wherein they are supervised by the control site. If the grain hopper of a combine is full, a harvest vehicle is sent from the control site to the combine to empty the grain hopper. The grain hopper can be controlled by remote control or by operators. A self-activated or automatic control of the harvest vehicle cannot be found in this publication. It can thus be regarded as disadvantageous that an operator must be provided for the remote control or operation of the harvest vehicle.

WO 00/35265 A describes an electronically supported operating method for a combine and a transport vehicle. The combine is provided with means to detect how full its grain hopper is. With the aid of the degree of grain hopper fullness, a map of the field and a position determination device provided with a satellite receiving unit, a determination is made as to when and at what location a transfer of the grain to the transport vehicle should take place. The transport vehicle equipped with a position determination device is then instructed, through a correspondingly informed driver or automatically, to go at the expected time to the expected location where the transfer operation is to take place. Parallel travel of the combine and the transport vehicle while emptying of the tank is not disclosed. The transport vehicle is a conventional tractor that is equipped with a driver's cab and corresponding operating devices.

DE 100 57 374 A, published after the priority date of the patent under consideration, describes a combination of a transport vehicle and a harvester. The transport vehicle is provided with an operator position from which the harvester can be remotely controlled. The harvester can also be moved along rows of crops. There is the possibility of synchronizing the speeds and steering of the two vehicles so as to facilitate the transfer of the crop from the harvester to the crop transport vehicle.

A similar procedure is described in DE 100 64 862 A, which was also published after the priority date of the patent under consideration. The harvester transmits information on its position, determined by a satellite receiving system, to the transport vehicle, which is provided with a display for the driver or is driver automatically, so that it drives to a desired position next to the self-propelled harvester and receives the crop. The transport vehicle is provided with a driver operating position.

The problem of the invention under consideration is to make available an unmanned and autonomously driven transport vehicle which is suitable for receiving the crop from a harvester while traveling.

BRIEF SUMMARY OF THE INVENTION

According to the invention, this problem is solved with a combination of a harvester and a transport vehicle with the features of Claim 1. Advantageous developments and refinements of the invention can be obtained with the features contained in the subsequent claims.

It is proposed that an unmanned transport vehicle have at least one driven and at least one steered axle, so that, in connection with a position data receiving unit connected to an electronic controller, it can move by means of its own drive relative to the pertinent position of a harvester, which as a rule is manned. The transport vehicle can move parallel to the harvester and receive the crop from it. It can dock parallel with, for example, a combine, for emptying the hopper.

In this way, the transport vehicle can follow a harvester without a rigid mechanical connection being present. However, there is also the possibility of controlling the transport vehicle's movement such that it can assume a very specific purposeful position relative to the harvester, to enable receiving the crop from the correspondingly designed lead vehicle without cumbersome maneuvers being necessary. In the same way, a second transport vehicle can be controlled such that it is joined to the first transport vehicle and follows in its tracks or is offset relative to its tracks.

One can also assume that the possible savings in the procurement cost for a process chain with transport vehicles according to the invention and a "virtual towing bar" are large, in comparison to previous transport systems, if one considers that many vehicles are no longer needed and the remaining components can be standardized. Also, the requirements regarding demands on the human being and his attention during operation of a process chain with transport vehicles according to the invention are lowered in comparison to other transport systems, as a result of the clearly lower number of vehicles, the high degree of automation of the processes, and the support by driver assistance systems. Since the transport vehicle is operated automatically, the driver's comfort now depends only on the quality of the lead vehicle, and the driver is dissociated from all of the trailer's vibration excitation. Furthermore, the compression of the ground by a process chain with transport vehicles according to the invention can be reduced in comparison to all other transport systems, since the mass of the economized vehicles no longer compresses the ground; with the transport vehicle, the mechanical towing bar and heavy loading container devices can be economized, and the vehicle can be produced with lightweight materials. Tire filling units permit an automatic lowering of the tire pressure on the field, so as to increase the contact surface of the tires and to reduce the ground pressure. A mass reduction of the harvesters can also be attained by constantly emptying the tank on the transport vehicle, which is propelled parallel, wherein the machine design of the "virtual towing bar" permits all possibilities of the track-offset driving of the transport vehicle and other track variations by single-wheel steering and hexapod-axle suspension.

By the "virtual towing bar," the control horizon of a transport vehicle or its vehicle management can be expanded such that the vehicle can move freely and autonomously if it is asked to do so by a lead vehicle. If a lead vehicle is not in the vicinity or is "inactive," then a transport vehicle can also be conducted by a control center to the next usage location with the aid of electronic maps, and a GPS-positioning system can be used on the field. Hindrances are marked and guide lines, which the transport vehicle can follow or must bypass, are entered on the topological maps.

Unmanned lead vehicles expand the control space of the transport vehicle such that the transport vehicle can also be used on the road in the future, which experiments with driver assistance systems have proven.

Examples of receiving units which can receive wireless position coordinates are satellite position-determining systems (also differential), radio and/or radar signal-receiving units. The combined use of several different receiving units expands the possibilities of an independently drivable transport vehicle and also increases control accuracy. Satellite navigation devices for all vehicles of a process chain and CBS communication of all participants with one another reduce the danger of collisions and increase safety.

With an autonomously driven transport vehicle, the position and situation of the harvester, or generally the lead vehicle which is ahead, can be scanned with radar or laser procedures and/or electronic image processing, thereby generating the next theoretical movement vector of the transport vehicle from the relative positions of the lead vehicle and the transport vehicle.

Lead vehicles, such as tractors or harvesters, should be recognized by the transport vehicle from individual features. For every lead vehicle, therefore, special leading algorithms are placed in the electrical control and are again recalled after the transport vehicle has approached a given lead vehicle.

It may be advantageous also to use sensors on such transport vehicles according to the invention. They can be placed on the axles and/or the wheels, so as to determine the rotational speeds, torques, respective masses and/or wheel positions.

The transport vehicle consists of a chassis and at least one driving-axle unit. The chassis should permit the attachment of various dump, pallet and slurry spreader structures, etc., so that the transport vehicle can be used in many diverse ways. Adaptive and active suspension systems can be used. Each axle unit can consist of an axle bracket and two wheel heads with servo drive, servo brake, and servo steering. Also, two or more driving axles can be used. A change in the movement direction of the entire vehicle, however, can be attained only via a change in the movement vectors of the individual wheels. In contrast to conventional steering methods, this requires more intelligence and an expansion of the code to be processed and the required storage capacity. After the discussion of the external control space of the electrical control of a driving-axle trailer, the important thing is to also clarify the control spaces of the movement vectors of all wheels and the yaw behavior of the entire vehicle. Single-wheel drives on the transport vehicles reduce the breakdown probability of the entire system through their multiple redundancy and increase the safety in the process chain. As a primary power unit, a central underfloor diesel engine and generator, or alternatively, a fuel cell, can be used. The drive of the transport vehicle should be effected electrically directly on the axles or preferably on the drive wheels, perhaps with the insertion of a mechanical gear. Electrical components have the advantage that they can also be used at low temperatures and do not freeze. A system with several fuel cells can be regarded as promising, since they can convert the chemical energy content of the fuel directly into direct current and "burn" the fuel "cold" without a detour through a mechanical stage. Improved efficiencies can be attained with tractors if several fuel cells are used if the installed power is not fully utilized since individual cells can be turned off. Fuel cells have their best efficiencies of approximately 40 percent at close to their maximum capacity, in contrast to the diesel engine.

Since a transport vehicle in the harvest process chain should as a rule work together with a large number of vehicles, the principle of the "virtual towing bar" substantially facilitates transport uses, since coupling no longer must be done manually. With an appropriate design of the transport vehicle according to the invention, containers can, after docking, be moved from one transport vehicle to another, or to a nondriven trailer or a commercial motor vehicle. The assumption is that the productivity of a process chain of transport vehicles with "virtual towing bar" increases in comparison to traditional transport systems because of the flexibility and high degree of automation gained, the omission of manual coupling maneuvers, and the easy change-over of containers.

BRIEF DESCRIPTION OF THE SEVERAL VIEWS OF THE DRAWING(S)

The invention will be described below by way of example. The figures show the following.

DETAILED DESCRIPTION OF THE INVENTION

Figure 1:
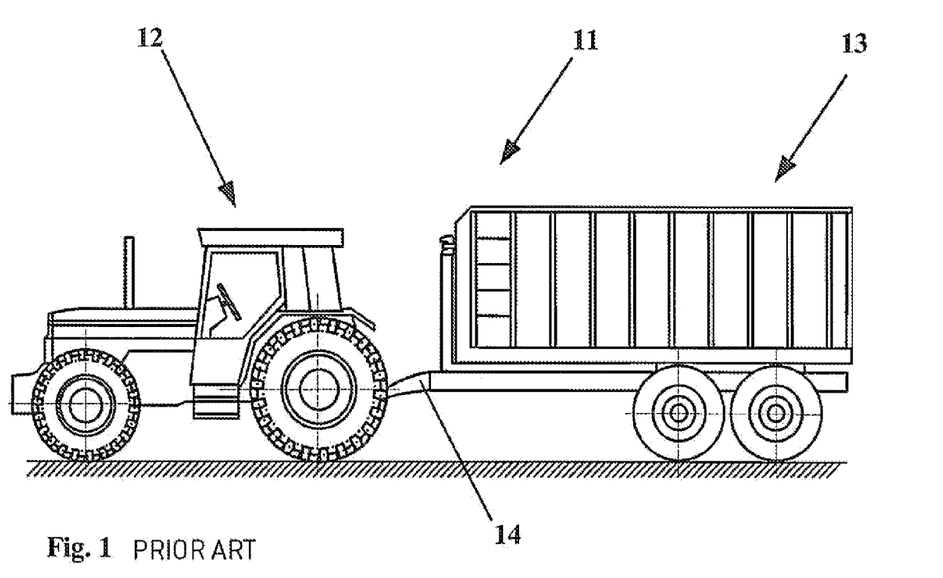
FIG. 1: a tractor with nondriven tandem axle trailer (prior art)

FIG. 1 shows a transport vehicle 11 with an agricultural tractor 12 and a tandem-axle trailer 13 according to the prior art, which are connected to one another via a towing bar 14. The disadvantages consist in that the tractor—with its own weight of 7 tons and a towing bar 14 support load of 3 tons—cannot pull the trailer, which is almost twice as heavy, under adverse weather conditions.

Figure 2:
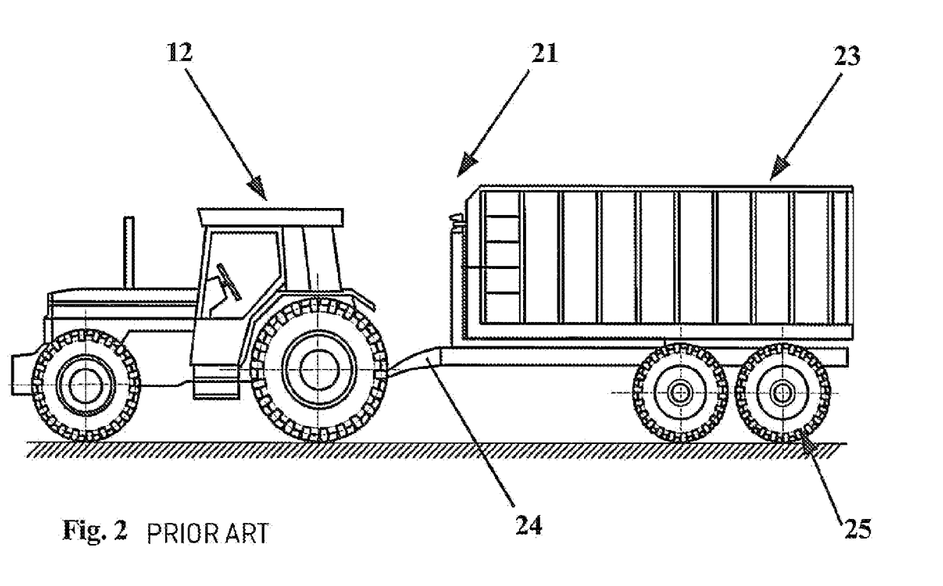
FIG. 2: a tractor with tandem-axle-driving-axle trailer (prior art)

In FIG. 2, this traction problem is solved in that the tandem-axle trailer 13 is replaced by a driving-axle trailer 23 with two driving axles 25, so that the useful adhesion weight of the vehicle combination 21 has increased by the mass of the driving-axle trailer 23 and the service load by approximately 20 tons.

Figure 3:
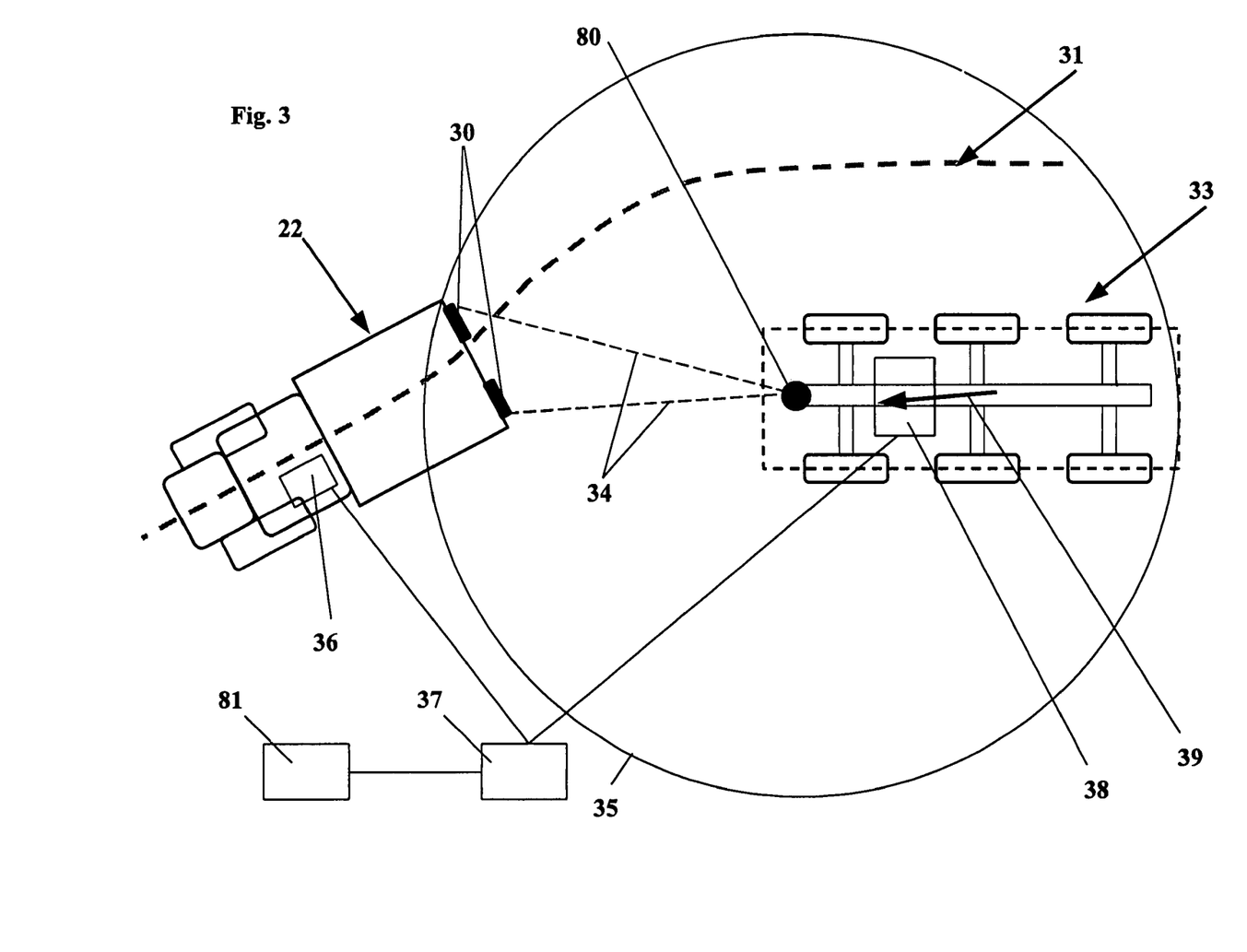
FIG. 3: a top view of a turning lead vehicle, which asks a transport vehicle via radio to perform a coupling operation, wherein the transport vehicle determines the position and situation of the lead vehicle.

The transport vehicle 33 shown in FIG. 3 in the form of a driving-axle trailer with three axles is connected with the lead vehicle via a "virtual towing bar" 34. The manned lead vehicle 22 overtakes the transport vehicle 33 on the track 31 and places itself within the control space 35, in front of the transport vehicle 33.

The driver of the lead vehicle 22 asks the transport vehicle 33 to dock itself, via a radio link path from radio 36 to control site 37 to the electronic control 38. The controller 38 scans the position of the lead vehicle 22 with 360° radar 80 and generates a sequence of movement vectors 39 for the approach, with the data stored under the identification of the lead vehicle 22.

The order for the transport vehicle 33 to dock itself can also be given by an external central control site 81.

Figure 4:
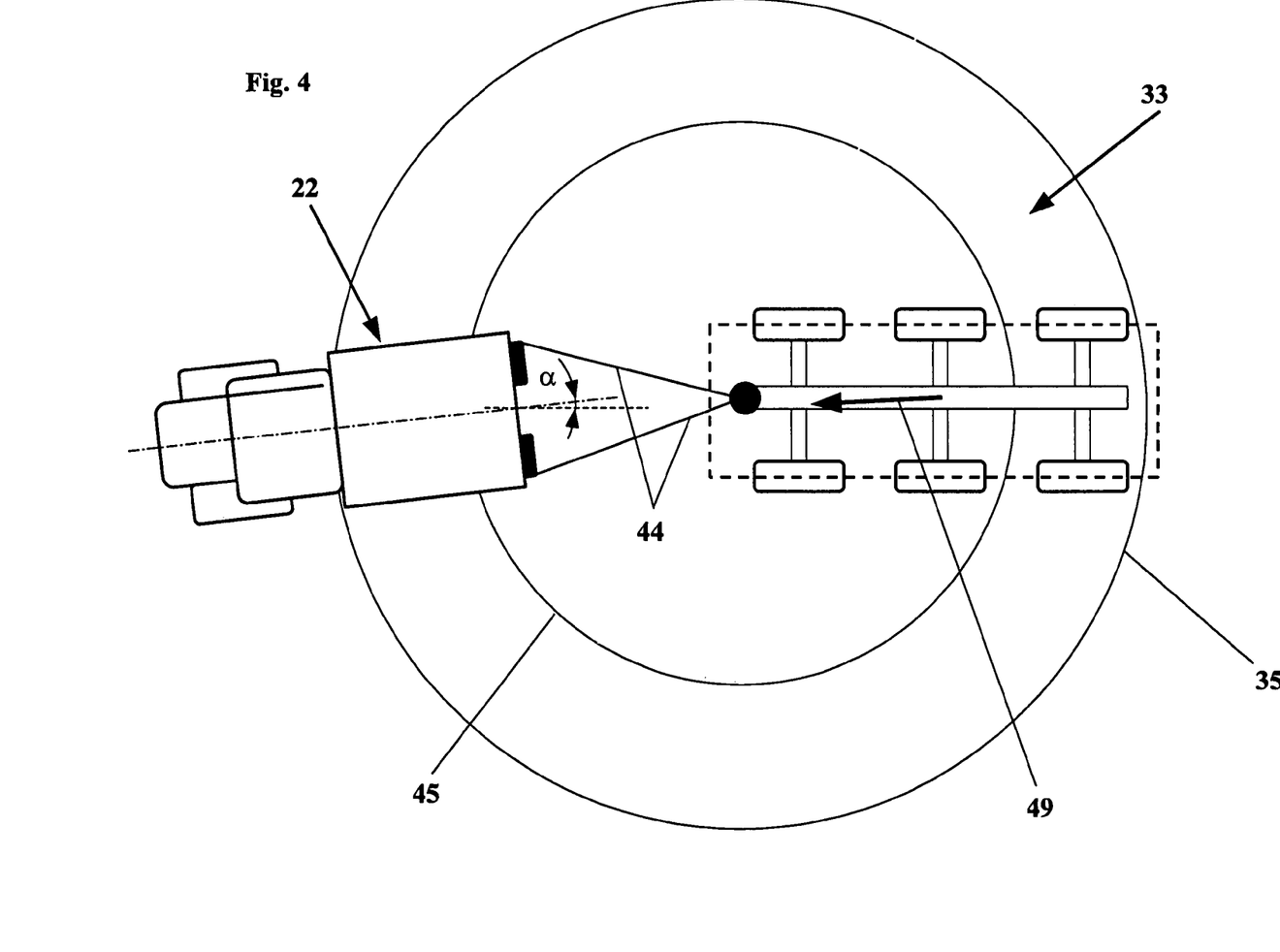
FIG. 4: With a simultaneous movement of the two vehicles, the transport vehicle reduces, in phase 1, the separation from the lead vehicle.

In FIG. 4, the distance between the vehicles 22 and 33 has been reduced with respect to their position in FIG. 3, which can also be deduced from the diameters of the control spaces 35 and 45. Except for an angular difference alpha, the transport vehicle 33 follows the lead vehicle 22 already in the track. The movement vectors 39 and 49 have changed only slightly.

Figure 5:
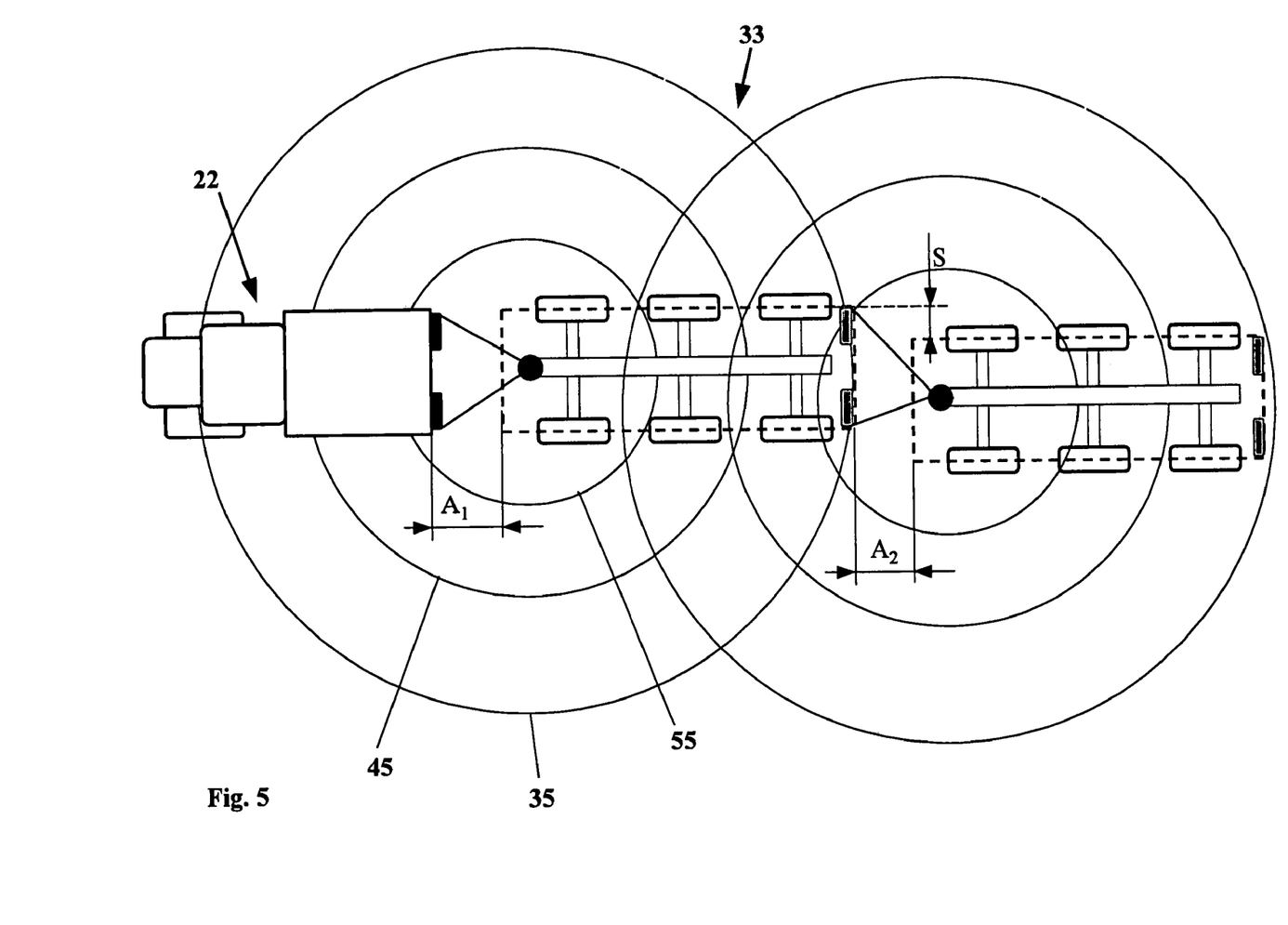
FIG. 5: In phase 2, the transport vehicle approaches to a working distance A1 from the lead vehicle. A second transport vehicle is coupled in the same manner.

In FIG. 5, the working distance A1 has been achieved and the transport vehicle 33 is completely ready for use. It is also shown that a second driving-axle trailer has approached the first transport vehicle 33 up to the working distance A2 according to the same method. The order to perform a coupling operation in an offset track was complied with, which is documented by the track offset S.

Figure 6:
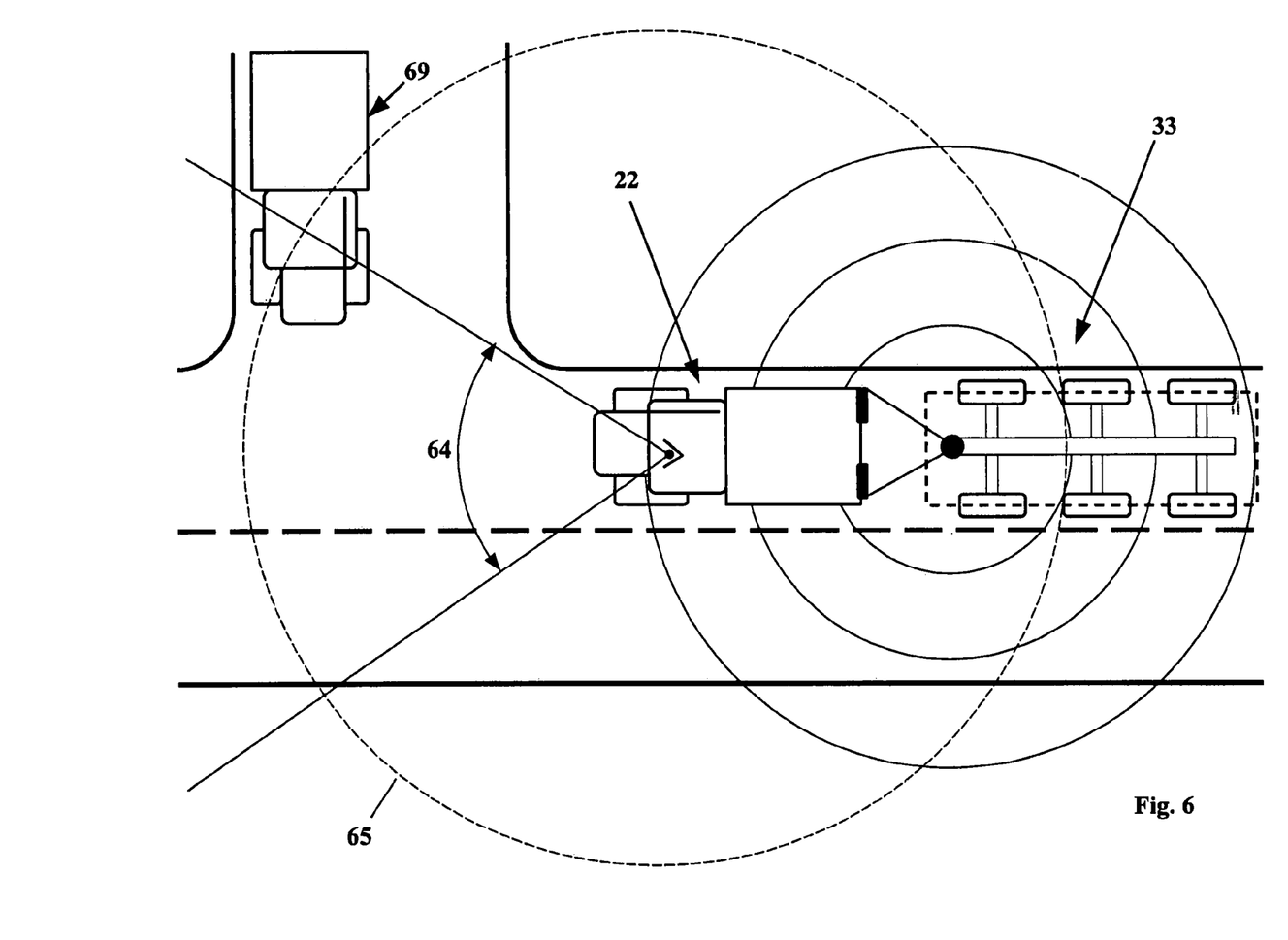
FIG. 6: Expansion of the control space of the transport vehicle on the road by the control distance of the manned lead vehicle or how far the driver can see.

FIG. 6 shows the expansion of the control space of the transport vehicle 33 by the control horizon of the lead vehicle 22 or how far the driver can see. The manned lead vehicle 22 expands the use range of the transport vehicle 33 for road transport. Two rays are shown, proceeding from the eye perspective of the driver, which enclose an angle of vision 64. Within this angle of vision the driver recognizes the vehicle 69 that approaches a crossing from the right. The transport vehicle 33 follows the manned lead vehicle 22 as if coupled by a mechanical shaft.

Figure 7:
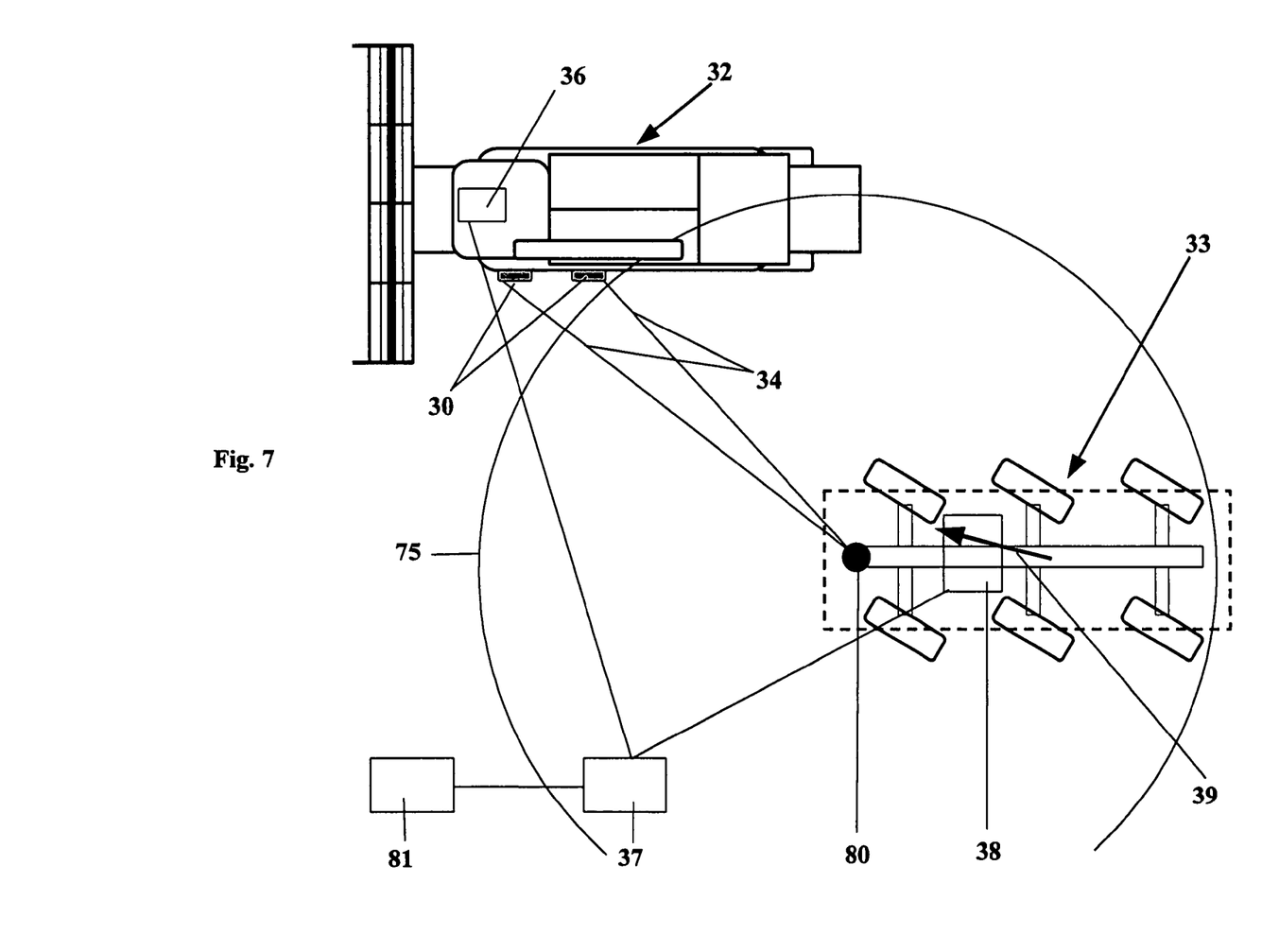
FIG. 7: After the order to empty the hopper, the transport vehicle initiates determination of the position of a combine as the lead vehicle and approaches it with steered wheels.

Since harvesters 32, such as the depicted combine, in the harvest chain are also to be regarded as lead vehicles for transport vehicles 33, transverse movements are also required in addition to the longitudinal travel of the transport vehicle 33, in order to dock with a combine laterally, as depicted in FIG. 7. All procedures take place basically in a manner analogous to FIG. 3.

The driver of the harvester 32 asks the transport vehicle 33 to dock itself, via the radio link path from radio 36 to the control site 37 to the electrical control 38 of the transport vehicle. A 360° radar 80, as an example of a receiving unit, senses the position of the harvester 32 wirelessly and calculates a sequence of movement vectors for the approach to the harvester 32, acting as the lead vehicle, with the data stored under the identification of the harvester 32.

The "virtual towing bar" 34 extends from the harvester 32 laterally between the marking 30 of the harvester 32 and the 360° radar 80. The calculated movement vector 39 points in the direction of the marking 30 of the harvester 32. In FIG. 7, the transverse travel is introduced via steering of the single-wheel drive of the transport vehicle 33.

The order to couple the transport vehicle 33 can also be given by an external central control site 81.

Figure 8:
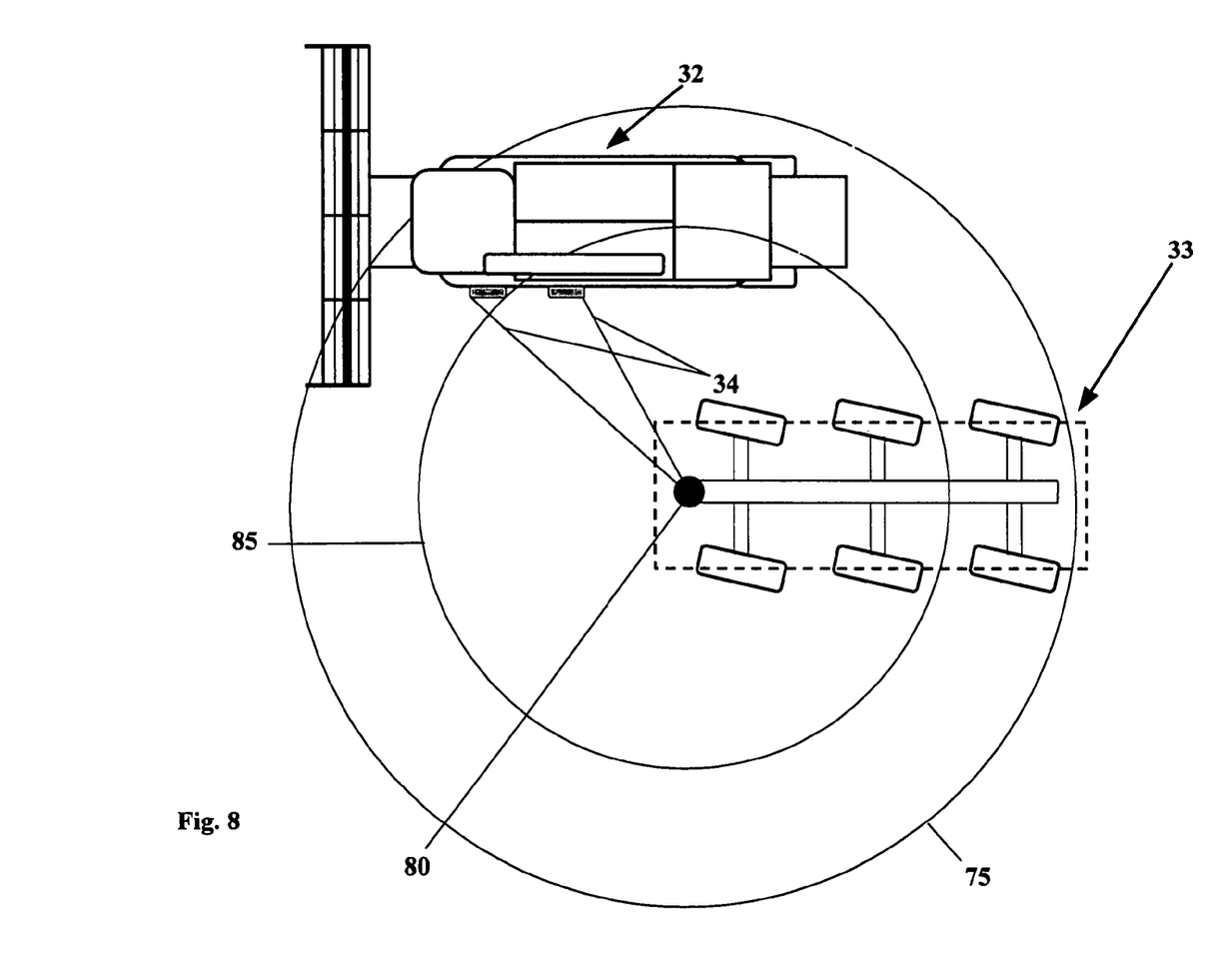
FIG. 8: Approach to a lead vehicle in the first phase 1.

In FIG. 8, the transport vehicle 33 has approached the harvester 32 up to the control space 85 and the 360° radar 80 detects the position of the harvester 32 via the "virtual towing bar" 34. The data stored under the identification of the harvester 32 permit the generation of a sequence of movement vectors for the approach.

Figure 9:
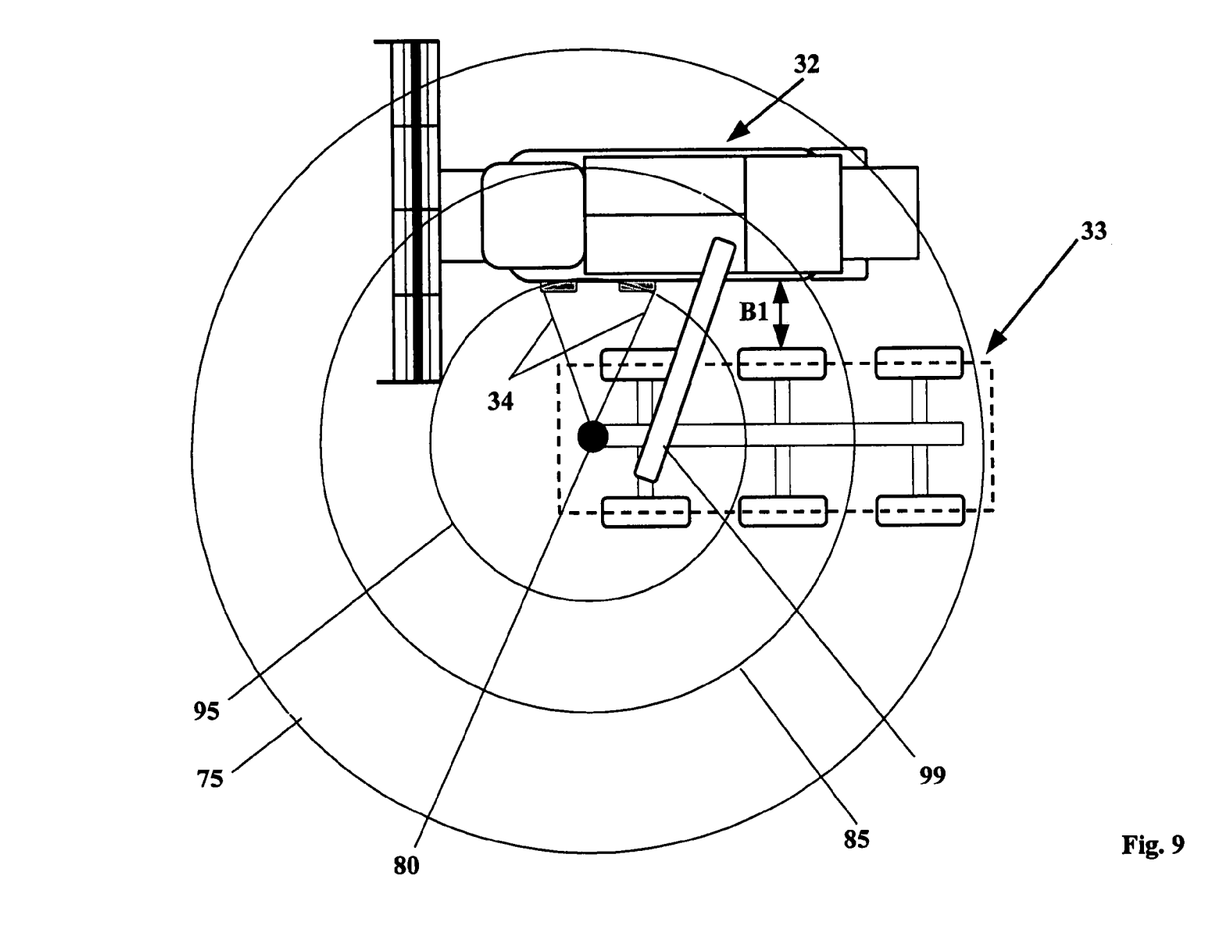
FIG. 9: Lateral docking with a lead vehicle at a distance B1 in the second phase 2 and preparation of the transfer operation.

FIG. 9 shows that the transport vehicle 33 has docked, according to the position of the "virtual triangle" 34, at the desired distance B1 from the harvester 32. The transfer auger 99 has already been brought into position. Since both vehicles are in motion during emptying of the hopper of the harvester 32, the positions of the vehicles relative to one another must be continuously monitored and corrected. In order to guarantee a uniform loading of the transport vehicle 33, the relative position of the transfer tube 99 should also be readjusted.

Figure 10:
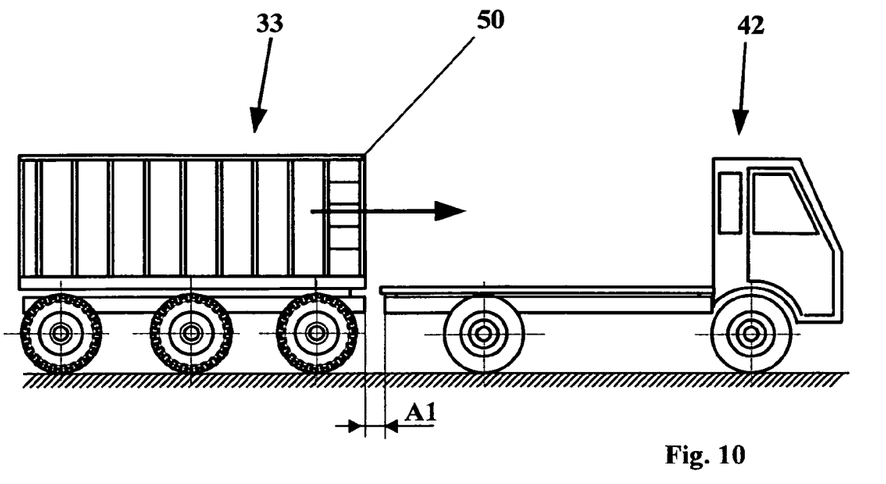
FIG. 10: docking of a transport vehicle to a commercial motor vehicle and transfer of a container for removal transport.

FIG. 10 shows a situation in which a transport vehicle 33 received the order, from a commercial motor vehicle 42 as the lead vehicle, to transfer the full container 50 for removal transport. As a result of its own positions and those of the commercial motor vehicle 42 giving the order, the transport vehicle 33 is able to drive up to the commercial motor vehicle 42 and to dock for transfer of the container 50 at a distance A1. This occurs in a manner analogous to FIG. 5, with the difference that the distance A1 is only about 5 cm.

Figure 11:
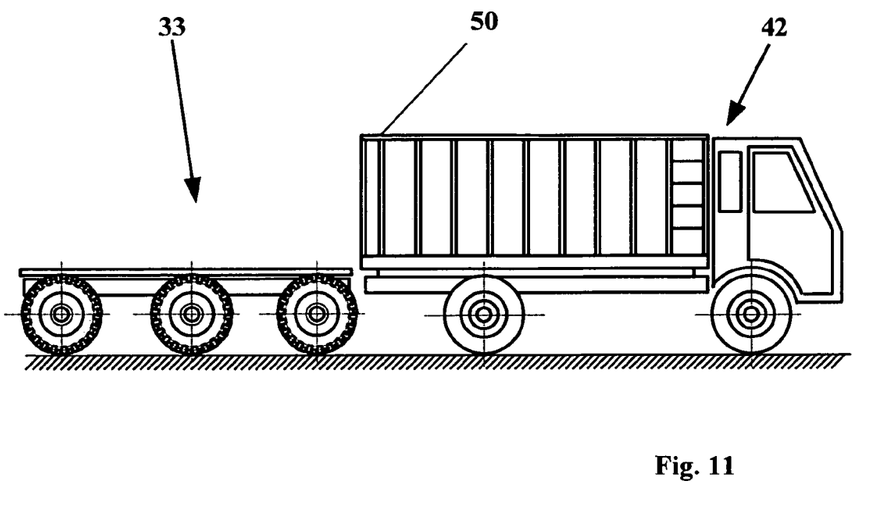
FIG. 11: departure of the container with a conventional commercial motor vehicle as the lead vehicle.

After transfer of the container 50, the commercial motor vehicle 42 is ready for departure and leaves transport vehicle 33 without a container. The transport vehicle 33 is again ready to receive an empty container.

In the method of autonomous agricultural transport with transport vehicles 33 and lead vehicles 22, 32, 42, the positions of the participating vehicles must be detected and recalculated within milliseconds. From these sequences, three configurations for rear and lateral coupling to a lead vehicle were retained as FIGS. 3 to 5 or FIGS. 7 to 9.

The process technology of three-axle transport vehicles 33 was depicted in FIGS. 1 to 11 in an interplay with different lead vehicles 22, 32, 42. Moreover, rapidly moving lead vehicles 22, 32, 42 and transport vehicles 33 can be used, for example, in the construction of highways and with a large number of uses in the off-road area.

In addition to the favored three-axle transport vehicle 33, however, any other number of drive axles for transport vehicles is also conceivable.

In addition to 360° radar 80, methods of laser technology and ultrasound or electronic image processing can also be used as "virtual towing bars."

The interplay of the "virtual towing bar" 34 control triangle, between the 360° radar 80 of the transport vehicle 33 and the marking 30 of the lead vehicle 22, 32, 42, is an outstanding example of the new drive technology.

From the measurement data, the electronic control 38 of the autonomous transport vehicle 33 processes the momentary movement vector 39 of the vehicle and derives the new theoretical specifications of the movement vectors of the respective single-wheel drives therefrom.

These specifications are transmitted, via a CAN bus or another communication system, to the controllers of the single-wheel drives. Implementation of the calculated specifications for rotational speed, torque, and angle turnings of the wheel drives is controlled and monitored by the electronic controller of the single-wheel drives.

Whereas the transport vehicle 33 should be upgraded with regard to its electronic functions, to be able to flexibly adapt to all working requirements in the course of a year, the electronic upgrading of conventional lead vehicles 22, 32, 42 can be limited to the addition, for example, of a satellite reception station and/or a CBS radio unit.

An intelligent autonomously moving transport vehicle 33 can have elements for the following functions on board:
 satellite receiving station
 CBS radio unit with identification of the lead vehicle that is calling
 "virtual electronic shaft" 34 with 360° radar 80 to detect the position of a lead vehicle 22, 32, 42 that is calling
 electronic control 38 with a microprocessor with sufficient power and storage capacity recall of the steering algorithms of the identified lead vehicle 32 and calculation of the movement vectors 39 of the entire vehicle and of the single-wheel drives of the transport vehicle 33 commanding of the specification data for the single-wheel drives via the communication net processing of an operational cycle of all single-wheel drives and repetition of the processing loop until the working distance A1 is attained coupling to the lead vehicle 22, 32, 42 with the "virtual electronic shaft" and removal transport of the entire rig docking of a transport vehicle 33, at a distance of approximately 5 cm, to a commercial motor vehicle 32 for the transfer of a container 100 for removal transport etc.

As a primary power unit for a transport vehicle 33, a central underfloor diesel engine with generator, for example, can be considered, the alternating current of which is rectified by a rectifier and is supplied, as a direct current, to the single-wheel motors via an intermediate circuit, wherein, per wheel, a controller and inverse rectifier set the wheel speeds and torques, prespecified by the electronic control.

A primary power unit with distributed fuel cells of approximately 40 kW can also be placed between the wheels as individual units, to the right and left, and offer the advantage that the chemical energy content of the fuel is made available directly as a direct current, without any detour through a mechanical stage.

The invention claimed is:

1. A vehicle combination comprising:
 a self-propelled harvesters and
 a transport vehicle adapted to receive harvested crops from the harvester, the transport vehicle having at least one driven and at least one steered axle;
 an electronic control unit on the transport vehicle for controlling the driven and steered axle of the transport vehicle; and
 a receiving unit in communication with the control unit, the receiving unit used to receive position data of the harvester such that the control unit can be operated to automatically control the transport vehicle in relation to the position of the harvester so as to receive harvested crops from the harvester, wherein the control unit is operated to automatically drive the transport vehicle to collect crops from the harvester during travel, and wherein the transport vehicle is unmanned.

2. The vehicle combination according to claim 1, wherein the receiving unit is designed to receive information containing position coordinates from a position determination system.

3. The vehicle combination according to claim 2 wherein the harvester is provided with a satellite position determination system and position signals are communicated to the receiving unit of the transport vehicle.

4. The vehicle combination according to claim 2 wherein the harvester is provided with a GPS position determination system.

5. The vehicle combination according to claim 2 wherein the harvester is provided with a laser position determination system.

6. The vehicle combination according to claim 2 wherein the transport vehicle is provided with a laser beam guidance system.

7. The vehicle combination according to claim 2 wherein the transport vehicle is provided with an electronic camera with image processing system.

8. The vehicle combination according to claim 2 wherein the control unit is operated to calculate a sequence of movement vectors for the transport vehicle to approach the harvester using a stored identifier for the harvester.

9. The vehicle combination according to claim 8 wherein the identification data of the harvester is stored in the control unit.

10. The vehicle combination according to claim 1 wherein the harvester is equipped with a movable transfer tube for the transfer of harvested crops to the transport vehicle, and wherein the relative position of the transfer tube can be adjusted automatically for the uniform loading of the transport vehicle.

11. The vehicle combination according to claim 1 wherein sensors are provided on axles and wheels of the transport vehicle for the determination of movement vectors.

12. The vehicle combination according to claim 1 wherein sensors are provided on axles and wheels of the transport vehicle for the determination of rotational speeds.

13. The vehicle combination according to claim 1 wherein sensors are provided on axles and wheels of the transport vehicle for the determination of torques.

14. The vehicle combination according to claim 1 wherein sensors are provided on axles and wheels of the transport vehicle for the determination of respective masses.

15. The vehicle combination according to claim 1 wherein the wheels of the transport vehicle can be driven and steered individually.

16. The vehicle combination according to claim 1 wherein interchangeable crop containers can be mounted on a vehicle chassis of the transport vehicle.

17. The vehicle combination according to claim 1 wherein the transport vehicle is provided without an operator workplace.

* * * * *